US009188767B2

(12) United States Patent
Ito et al.

(10) Patent No.: US 9,188,767 B2
(45) Date of Patent: Nov. 17, 2015

(54) RELAY LENS SYSTEM FOR A HIGH DYNAMIC RANGE PROJECTOR

(71) Applicant: CHRISTIE DIGITAL SYSTEMS USA, INC., Cypress, CA (US)

(72) Inventors: Koichi Ito, Kitchener (CA); Mang Li, Waterloo (CA); John Domm, Kitchener (CA); Jerome D. Shields, Yardley, PA (US)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 0 days.

(21) Appl. No.: 14/070,831

(22) Filed: Nov. 4, 2013

(65) Prior Publication Data

US 2015/0124337 A1  May 7, 2015

(51) Int. Cl.
    *G02B 17/00*   (2006.01)
    *G02B 3/00*    (2006.01)
    *G02B 13/00*   (2006.01)
    *G02B 13/22*   (2006.01)
    *G02B 27/00*   (2006.01)

(52) U.S. Cl.
    CPC ............ *G02B 13/0095* (2013.01); *G02B 13/22* (2013.01); *G02B 27/0012* (2013.01)

(58) Field of Classification Search
    USPC .................................. 359/642, 726, 733, 740
    See application file for complete search history.

(56) References Cited

U.S. PATENT DOCUMENTS

| 4,231,636 A | 11/1980 | Abe |
| 5,499,139 A | 3/1996 | Chen et al. |
| 6,379,010 B1 | 4/2002 | Suzuki et al. |
| 6,480,263 B1 | 11/2002 | Smith |
| 6,511,183 B2 | 1/2003 | Shimizu et al. |
| 6,768,546 B2 | 7/2004 | Sato |
| 6,775,073 B2 | 8/2004 | Kamo |
| 6,816,290 B2 | 11/2004 | Mukawa |
| 7,020,368 B2 | 3/2006 | Li |
| 7,136,209 B2 | 11/2006 | Lerner et al. |
| 7,224,335 B2 | 5/2007 | Gibbon et al. |

(Continued)

FOREIGN PATENT DOCUMENTS

WO    WO 2012/139634 A1    10/2012

OTHER PUBLICATIONS

Dieter Meschede; "Optics, Light and Lasers"; John Wiley & Sons; http://books.google.ca/books?id=GWXuqG1YAKoC &q=compensator+plate+optics#v=snippet &q=compensator%20plate%20optics&f=false; 2008; (Accessed Aug. 28, 2013).

(Continued)

*Primary Examiner* — Jack Dinh
(74) *Attorney, Agent, or Firm* — Perry + Currier, Inc.

(57) ABSTRACT

A relay lens system for a high dynamic range projector is provided. The relay lens system comprising: a light input; a light output; one or more lenses configured to relay light from the light input to the light output; and, an aperture stop configured to provide a given numerical aperture to the light being relayed through the one or more lenses, the combination of the given numerical aperture and the one or more lenses are configured to introduce a spherical aberration in the light between the light input and the light output, the spherical aberration changing a shape of a pixel in the light from an approximate square shape at the light input to a function having an upper boundary and a lower boundary based on a distance from a center of the pixel, and a pixel dimension of a dither pattern in the light entering the light input.

20 Claims, 7 Drawing Sheets

(56) References Cited

U.S. PATENT DOCUMENTS

| | | |
|---|---|---|
| 7,961,399 B2 | 6/2011 | Penn |
| 8,125,702 B2 | 2/2012 | Ward et al. |
| 8,251,512 B2 | 8/2012 | Adkins et al. |
| 8,314,922 B2 | 11/2012 | Cornell et al. |
| 8,334,935 B2 | 12/2012 | Yoon |
| 8,446,351 B2 | 5/2013 | Whitehead et al. |
| 2004/0066471 A1 | 4/2004 | Bierhuizen |
| 2010/0309443 A1 | 12/2010 | Cheng et al. |
| 2012/0106191 A1 | 5/2012 | Duong et al. |
| 2013/0266210 A1 | 10/2013 | Mrogan-Mar |

OTHER PUBLICATIONS

"Extended European Search Report", dated Mar. 2, 2015 in EP Application No. 14190576.0, filed Oct. 28, 2014.

"Extended European Search Report", dated Mar. 2, 2015 in EP Application No. 14190575.2, filed Oct. 28, 2014.

Greivenkamp, John E. Field Guide to Geometrical Optics. Bellingham, WA: SPIE, 2004. 70-83. Print Hecht, Eugene. Optics. Reading, MA: Addison-Wesley, 1998. pp. 176,177, 197. Print.

Melles Griot—Catalog. N. p. Barlow Scientific Group, 1999. pp. 1.1-1.3, 1.17-1.18, 1.27-1.28. Print.

Office Action (Jun. 12, 2015) Issued on Related U.S. Appl. No. 14/070,715.

RELAY LENS SYSTEM FOR A HIGH DYNAMIC RANGE PROJECTOR

FIELD

The specification relates generally to relay lenses, and specifically to a relay lens system for a high dynamic range projector.

BACKGROUND

High dynamic range projectors can attain the desired high dynamic range using a first light modulator providing a low resolution image and a second light modulator providing a higher resolution version of a similar image. A relay lens system there between relays light reflected from the first light modulator to the second light modulator, blurring the lower resolution image which illuminates the second light modulator. However, simply blurring the light does not result in an optimized high dynamic range and/or optimized contrast.

SUMMARY

In general, this disclosure is directed to a relay lens system for a high dynamic range (HDR) projector. The relay lens system relays light from a first light modulator to a second light modulator in the HDR projector. Rather than simply blur light, in an image being relayed from a first light modulator to a second light modulator in the HDR projector, the relay light system of present implementations introduces a spherical aberration into the light. Specifically the combination of given numerical aperture of the relay lens system and one or more lenses of the relay lens system are configured to: introduce a spherical aberration in the light between the light input and the light output; and, suppress one or more of the following in a ray fan plot of the spherical aberration: local maxima and local minima; and, points where a derivative of the ray fan plot is zero. Such a spherical aberration results in a change of shape of pixels in the image being relayed from an approximate square shape to an approximate Gaussian shape and/or a pseudo-Gaussian shape and/or a shape with a broad central region and a tail that extends over a plurality of pixels in the light at a light output of the relay system. Hence, an aperture stop, a position of the aperture stop, positions and type of lenses of the relay lens system, and at least one of type, radius of curvature, thickness, and material of each of lenses, are all configured to result in the desired ray fan plot and/or the desired change in shape of the pixels.

In this specification, elements may be described as "configured to" perform one or more functions or "configured for" such functions. In general, an element that is configured to perform or configured for performing a function is configured to perform the function, or is suitable for performing the function, or is adapted to perform the function, or is operable to perform the function, or is otherwise capable of performing the function.

An aspect of the specification provides a relay lens system comprising: a light input; a light output; one or more lenses configured to relay light from the light input to the light output; and, an aperture stop configured to provide a given numerical aperture to the light being relayed through the one or more lenses, the combination of the given numerical aperture and the one or more lenses are configured to introduce a spherical aberration in the light between the light input and the light output, the spherical aberration changing a shape of a pixel in the light from an approximate square shape at the light input to a function having an upper boundary and a lower boundary defined as follows: $LB(r)=0.9\times(\frac{1}{2}+\frac{1}{2}\cos(\pi r/N))$ for $r<N$, $LB(r)=0$ for $r\geq N$, $UB(r)=1.1\exp(-(r/N)2)$, where UB is the upper boundary, LB is the lower boundary, r is a distance from a centre of the pixel, and N is a pixel dimension of a dither pattern in the light entering the light input.

The combination of the given numerical aperture and the one or more lenses can be further configured to suppress one or more of the following in a ray fan plot of the spherical aberration: local maxima and local minima; and, points where a derivative of the ray fan plot is zero. The combination of the given numerical aperture and the one or more lenses can be further configured to balance a third order spherical aberration, a fifth order spherical aberration and a seventh order spherical aberration, to suppress one or more of: the local maxima and the local minima; and, the points where a derivative of the ray fan plot is zero.

The spherical aberration can further change a shape of a pixel in the light from an approximate square shape at the light input to one or more of: an approximate Gaussian shape at the light output; a pseudo-Gaussian shape at the light output; and, a shape with a broad central region and a tail that extends over a plurality of pixels in the light at the light output, as compared to the light input. The full width half maximum of the shape can extend over at least about +/−four of the plurality of pixels, and the tail can extend over at least +/−ten of the plurality of pixels. A full width half maximum of the shape can extend over between about +/−three and about +/−ten of the plurality of pixels, and the tail can extend over between about +/−five and about +/−thirty of the plurality of pixels.

The function can be within a given percentage of one or more of the upper boundary and the lower boundary.

The spherical aberration can comprise one or more of a third order spherical aberration, a fifth order spherical aberration, and a seventh order aberration in a ray fan plot of the spherical aberration.

The combination of the given numerical aperture and the one or more lenses can be configured to one or more of: balance a third order spherical aberration, a fifth order spherical aberration and a seventh order spherical aberration, to suppress one or more of: a local maxima and a local minima on a ray fan plot of the spherical aberration; and, points where a derivative of the ray fan plot is zero; and, suppress spherical aberrations in the light that are larger than one or more of: a third order spherical aberration; a fifth order spherical aberration; and a seventh order spherical aberration.

An aperture of the aperture stop can comprise a diameter that, at a given position of the aperture stop relative to a given lens, introduces at least a portion of the spherical aberration, and one or more of: balance a third order spherical aberration, a fifth order spherical aberration and a seventh order spherical aberration, to suppress one or more of: a local maxima and a local minima on a ray fan plot of the spherical aberration; and, points where a derivative of the ray fan plot is zero; and, suppress spherical aberrations in the light that are larger than one or more of: a third order spherical aberration; a fifth order spherical aberration; and a seventh order spherical aberration.

At least one of the one or more lenses can comprise a spherical lens.

The given numerical aperture can comprise an F-stop in a range of about F/2 to about F/8.

An aperture of the aperture stop can be: circular; or, one or more of: an oval; and asymmetrical, to correct for an anisotropic numerical aperture of the light entering the light input.

The aperture stop can comprise one or more of: an iris; a cat's eye; an apparatus configured to manually adjust a size of an aperture of the aperture stop; and, one or more of a motor and a stepper motor configured to adjust a size of the aperture of the aperture stop.

The relay lens system can further comprise an odd number of reflectors configured to relay the light received from the light input towards the light output.

The relay lens system can be bi-telecentric.

The one or more lenses can be further configured to magnify the light from the light input to the light output, wherein the magnification can be: greater than one, less than one, or about one.

A position of at least one of the one or more lenses can be adjustable along an optical axis of the relay lens system such that one or more of focus, zoom, and shape of a pixel of the light is adjustable by adjusting a position of at least one of the one or more lenses.

The relay lens system can further comprise one or more of: a first apparatus configured to manually adjust a position of at least one of the one or more lenses; a second apparatus configured to adjust positions of at least a two of the one or more lenses as a group; and, at least one of a motor and a stepper motor configured to adjust positions of one or more of the one or more lenses.

The relay lens system can further comprise a compensator plate configured to compensate for one or more of astigmatism and coma of the light.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
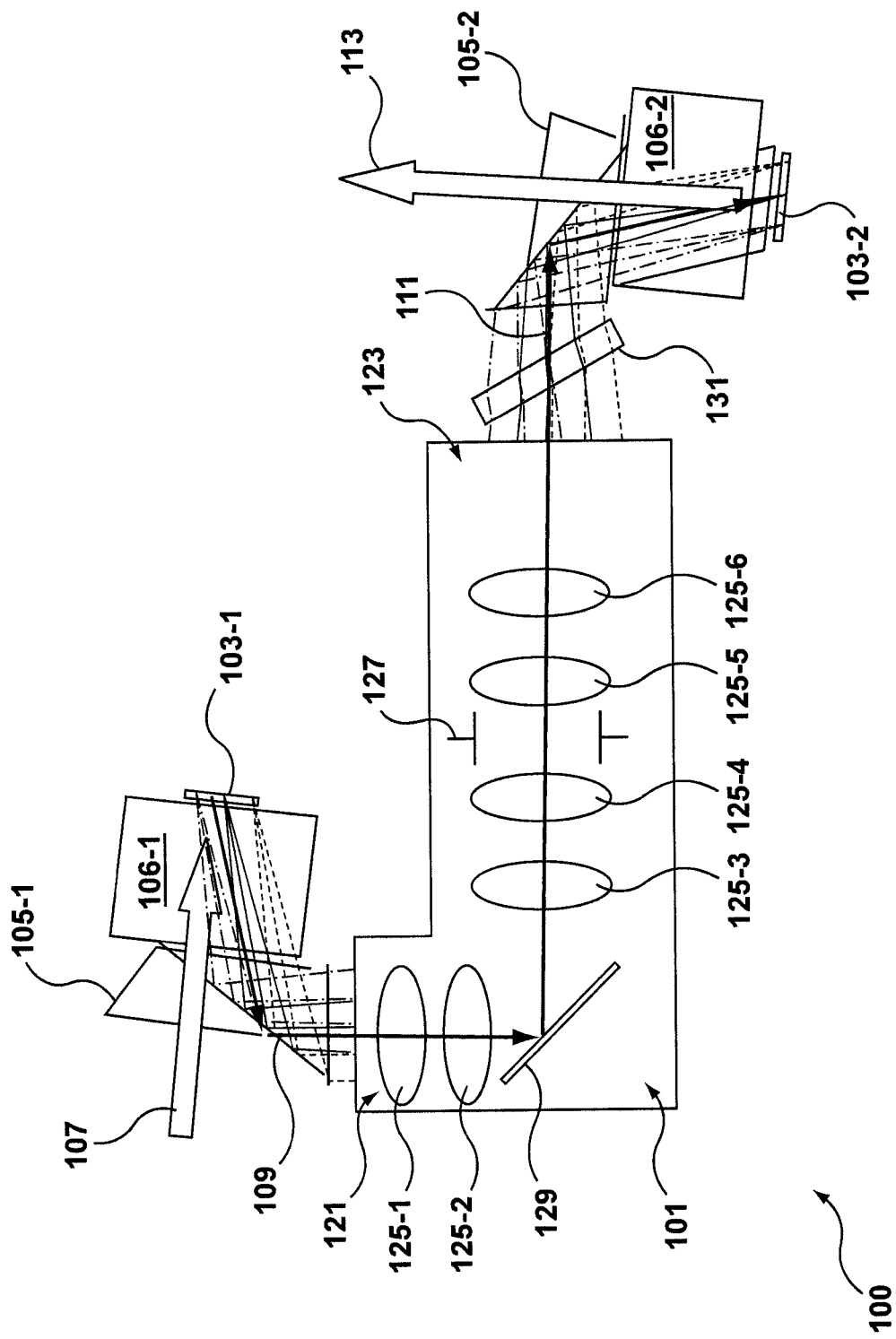
FIG. 1 depicts a system including relay lens system for a high dynamic range projector, according to non-limiting implementations.

FIG. 1 depicts a system 100 that comprises a relay lens system 101 for a high dynamic range (HDR) projector, according to non-limiting implementations. System 100 can comprise a portion of the HDR projector; for example, system 100 further comprises: one or more first light modulators 103-1; one or more second light modulators 103-2; prisms 105-1 for directing light 107 from a light source (not depicted) to the one or more first light modulators 103-1 and directing light 109 reflected from the one or more first light modulators 103-1 to relay lens system 101; and prisms 105-2 for directing light 111 exiting relay lens system 101 to the one or more second light modulators 103-2 and directing light 113 reflected from one or more second light modulators 103-2 to projection optics (not depicted) of the HDR projector. FIG. 1 further depicts light rays of light 107, 109 interacting with one or more light modulators 103-1, and light rays of light 111 interacting with one or more second light modulators 103-2.

One or more light modulators 103-1, 103-2 will be interchangeably referred to hereafter, collectively, as light modulators 103 and, generically, as a light modulator 103. Prisms 105-1, 105-2 will be interchangeable referred to hereafter, collectively, as prisms 105 and, generically, as prisms 105.

Each of light modulators 103 can comprise one or more of a phase modulator, a light modulator, a reflective light modulator, a transmissive light modulator, a liquid crystal on silicon (LCOS) device, a liquid crystal display (LCD) device, and a digital micromirror device (DMD). Further, each of prisms 105 can comprise wedge prism, and each set of prisms 105-1, 105-2 can comprise two wedge prisms that are positioned relative to one another to direct light to light modulators 103 and either to relay lens system 101 or projection optics. In some implementations, prisms 105-1, 105-2 are generally symmetrical with respect to one another. Further, in depicted implementations, system 100 comprises: a rectangular prism 106-1 between each one or more first light modulators 103-1 and prisms 105-1; and, a rectangular prism 106-2 between each one or more second light modulators 103-2 and prisms 105-2 to reduce air/glass interfaces in system 100. In other words, system 100 comprises two prism assemblies that are each comprised of multiple prism elements, including, but not limited to: prisms 105-1, rectangular prism 106-1 at one or more first light modulators 103-1; and prisms 105-2, rectangular prism 106-2 at one or more second light modulators 103-2. However, the arrangements of prisms 105, 106 are generally non-limiting, and other arrangements of other prisms, and light modulators, are within the scope of present implementations. Further, in some implementations, each respective light modulator 103 can be adjusted, as a group their associated prism assemblies.

One or more first light modulators 103-1 can comprise three light modulators, one for each of red, green and blue light, and light 107 can comprise red, green and blue light components; prisms 105-1 can hence direct respective red, green and blue components of light 107 to a corresponding first light modulator 103-1.

One or more first light modulators 103-1 are controlled by a processor (not depicted), and the like, to form an image at a first resolution. Light 109 reflected from one or more first light modulators 103-1 hence comprises the image at the first resolution, which is directed to relay lens system 101 by prisms 105-1. As will be described below, relay lens system 101 introduces a spherical aberration in light 109 entering therein. Light 111 exiting relay lens system 101 is reflected from one or more second light modulators 103-2, with prisms 105-2 directing respective red, green and blue components of light 111 to a corresponding second light modulator 103-2.

One or more second light modulators 103-2 are controlled by the processor, and the like, to form the image at a second resolution greater than the first resolution of the image formed at one or more first light modulators 103-1. Indeed, one or more second light modulators 103-2 forms the image that is projected by the projection optics.

Hence, light 111 is directed to areas of one or more second light modulators 103-2 where it is needed (e.g. lighter areas of the image), and directed away from areas of one or more second light modulators 103-2 where it is not needed (e.g. darker areas of the image), which leads to high dynamic range in images projected by the projection optics as areas of an image formed one or more second light modulators 103-2 that correspond to a dark area of an image to be projected, are either not illuminated and/or are illuminated with less light than a brighter area. Further, such an arrangement can also lead to both high local contrast ratios and high global contrast ratios.

For example, in some non-limiting implementations, the image formed at one or more first light modulators 103-1 can comprise a half-tone version of the higher resolution image formed at the one or more second light modulators 103-2, and relay lens system 101, by introducing the spherical aberration in light 111, spreads light from pixels over a larger area to ensure coverage of one or more light modulators 103-2, mitigate alignment issues, and to assist in providing the desired high dynamic range of the HDR projector, as well as a very high contrast ratio.

For example, in specific non-limiting implementations, one or more first spatial modulators 103-1 can comprise a 2K-DMD and one or more second spatial modulators can comprise a higher resolution 4K-DMD. While a similar image can be formed on each DMD, the 4K-DMD image will have a higher resolution than the 2K-DMD image. However, in other implementations, each light modulator 103 can comprise a similar light modulator of similar resolutions, and a processor (not depicted) can control the one or more first spatial light modulators 103-1 to form images of lower resolution than images at the one or more second spatial light modulators 103-2. However, a lower resolution light modulator can be used for the one or more first light modulators 103-1 to save cost in system 100.

Relay lens system 101 is generally configured to convert pixels of image in light 109 from an approximate square shape to an approximate Gaussian shape; indeed, such a Gaussian shape generally provides optimum high dynamic range in system 100, and further leads to better predictability of system 100.

As such, relay lens system 101 comprises: a light input 121; a light output 123; one or more lenses 125-1, 125-2, 125-3, 125-4, 125-5, 125-6 configured to relay light 109 from light input 121 to light output 123; and an aperture stop 127 configured to provide a given numerical aperture to light 109 being relayed through one or more lenses 125-1, 125-2, 125-3, 125-4, 125-5, 125-6. One or more lenses 125-1, 125-2, 125-3, 125-4, 125-5, 125-6, will be referred to hereafter, collectively as lenses 125, and, generically, as a lens 125. The combination of the given numerical aperture and one or more lenses 125 are configured to: introduce a spherical aberration in the light being relayed through relay lens system 101, between light input 121 and light output 123; and, suppress one or more of the following in a ray fan plot of the spherical aberration: local maxima and local minima; and, points where a derivative of the ray fan plot is zero, as will be explained in detail below.

In depicted implementations, relay lens system 101 further comprises an optional reflector 129 and/or an odd number of reflectors 129. Reflector(s) 129 can include, but are not limited to fold mirrors, prisms, dove prisms, and the like. Reflector 129 is described in more detail below In depicted implementations, relay lens system 101 further comprises at least one compensator plate 131, which can generally located along an optical axis of relay lens system 101. As depicted, compensator plate 131 is located after light output 123, and receives light 111 exiting light output 123. However, compensator plate 131 can be located prior to light input 121 and/or between two of prisms 105. Compensator plate 131 is described in more detail below.

While six lenses 125 are depicted in relay lens system 101, it is appreciated that more than six and less than six lenses can be used in relay lens system 101. Indeed, in some implementations, relay lens system 101 can comprise one lens. Further, while at least one of lenses 125 comprises a spherical lens, others of lenses 125 can be aspherical. Further lenses 125 include, but are not limited to, convex lenses, concave lenses, biconvex lenses, biconcave lenses, plano-convex lenses, plano-concave lenses, negative meniscus lenses, positive meniscus lenses, and the like.

Aperture stop 127 can be located between two of lenses 125. Further, lenses 125 are generally concentric along an optical axis of relay lens system 101, and aperture stop 127 is concentric with lenses 125.

The combination of aperture stop 127 and lenses 125 is generally chosen so that that a spherical aberration is introduced into light 109 transmitted through relay lens system 101, and specifically and suppress one or more of the following in a ray fan plot of the spherical aberration: local maxima and local minima; and, points where a derivative of the ray fan plot is zero. Specifically, an aperture of aperture stop 127 comprises a diameter that, at a given position of aperture stop 127 relative to a given lens 125 that introduces at least a portion of the spherical aberration, and filters out aberrations in the light that are larger than one or more of: a third order spherical aberration; a fifth order spherical aberration; and seventh order spherical aberration, as described in further detail below.

Figure 2:
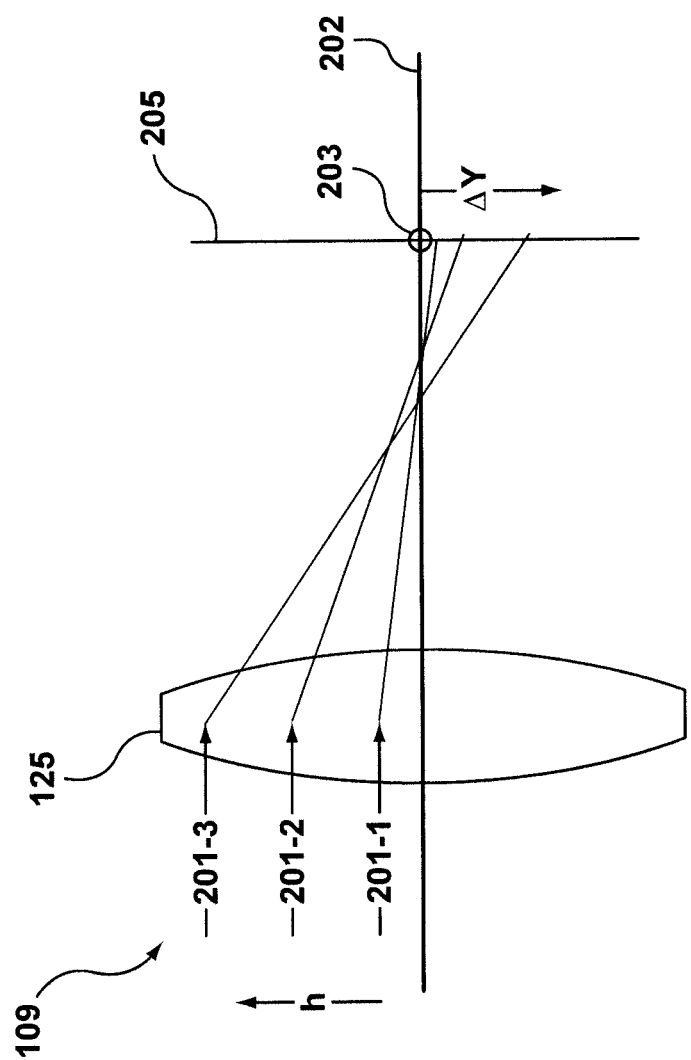
FIG. 2 depicts light interacting with a spherical lens, at different radius pupil coordinates of the spherical lens, to illustrate spherical aberrations of the spherical lens, according to non-limiting implementations.

To illustrate these concepts, attention is next directed to FIG. 2 which depicts light rays 201-1, 201-2, 201-3 of light 109 interacting with a spherical lens 125, at different radial pupil coordinates h of lens 125 (radial pupil coordinate h can also be referred to as a radial distance of each light ray 201 from a centre of lens 125, as each light ray 201 enters lens 125). Light rays 201-1, 201-2, 201-3 will be interchangeably referred to hereafter, collectively, as light rays 201, and generically as a light ray 201. Also depicted is an optical axis 202 of lens 125, which comprises a line passing through a centre of lens 125, and a focal point 203 of lens 125, and is provided as a visual aid for showing perpendicular and/or radial distances from a centre of lens 125 and/or perpendicular and/or radial distances from focal point 203. In general optical axis 202 is coincident with an optical axis of relay lens system 101.

Light rays 201 interact with lens 125, and ideally each light ray 201 will be focussed towards focal point 203 of lens 125. However, spherical aberrations are introduced as light rays 201 interact with lens 125 towards an outer edge of lens 125. For example, light ray 201-1, closer to a centre of lens 125 as compared to light rays 201-2, 201-3, is directed closer to focal point 203 than light rays 201-2, 201-3. Such deviation can be characterized by determining a perpendicular and/or radial deviation and/or transverse displacement ΔY of each light ray 201 from focal point 203, as each light ray 201 passes by focal point 203, for example through a plane 205 passing through focal point 203 and parallel to lens 125. Hence, plane 205 is merely provided as visual aid for showing perpendicular and/or radial distances from focal point 203, and is depicted on edge (i.e. oriented into the page). Further, a path of each light ray 201 is merely meant to represent a trend, and is not meant to be an exact representation of a spherical aberration of lens 125.

In general, a spherical aberration is an optical effect observed in various optical devices, such as lenses 125, which occurs due to increased refraction of light rays 201 when light rays 201 interact with lens 125 near its outer edge, in comparison with light rays 201 that interact with lens 125 nearer a centre of lens 125. In other words, a spherical aberration signifies a deviation of lens 125 from ideal operation of lens 125. Spherical aberrations generally result in an imperfection of a produced image, for example an image in light 111.

In general, a spherical lens has an aplanatic point (i.e., point where no spherical aberration occurs with light 109) only at a radius of lens 125 that equals the radius of the sphere (i.e. a surface of lens 125 comprises a portion of a sphere) divided by the index of refraction of the lens material. In some implementations, lens 125 can have an index of refraction index of about 1.5, which indicates that only about 43% of the area (67% of diameter) of lens 125 is generally used when avoiding spherical aberrations. However, in present implementations, a diameter of aperture stop 127 is deliberately chosen that introduces a spherical aberration into light 109. In other words, a radius (and/or diameter) of aperture stop 127 is chosen that includes a radius (and/or diameter) of lens 125 that is greater than the aplanatic point.

For example, the deviation $\Delta Y$ of light rays 201 of light 109 is generally related to radial pupil coordinate h as follows:

$$\Delta Y \propto a_3 h^3 + a_5 h^5 + a_7 h^7 \ldots + a_n h^n + \ldots \qquad \text{Equation (1)}$$

In Equation (1), "n" is an odd integer, and each of $a_3$, $a_5$, $a_7$, $a_n$ etc. are constants that can be determined for a given spherical lens and/or used to characterize a given spherical lens. Further, term $a_3 h^3$ can be referred to as third order spherical aberration, term $a_5 h^5$ can be referred to as a fifth order spherical aberration, term $a_7 h^7$ can be referred to as a seventh order spherical aberration and the like. It is appreciated that Equation (1) includes spherical aberration terms that are higher than a seventh order spherical aberration.

No term $a_1 h$ is shown as a term $a_1 h$ represents ideal behaviour as lens 125 is defocused: i.e., ideally, a lens defocuses linearly.

Further, Equation (1) generally describes spherical aberrations about an optical axis in symmetry optics. In asymmetry optics (e.g. lens 125 could be decentered from an optical axis of relay lens system 101), even order terms can occur in Equation (1).

In general, each of $a_3$, $a_5$, $a_7$, ... $a_n$ are generally of values so that the third, fifth and seventh order spherical aberrations are small until radial pupil coordinate h is above a given value, for example until radial pupil coordinate h is greater than the aplanatic point. In other words, there is a diameter of lens 125 at which one or more of third, fifth, and seventh order spherical aberrations dominate the spherical aberration of lens 125.

Figure 3:
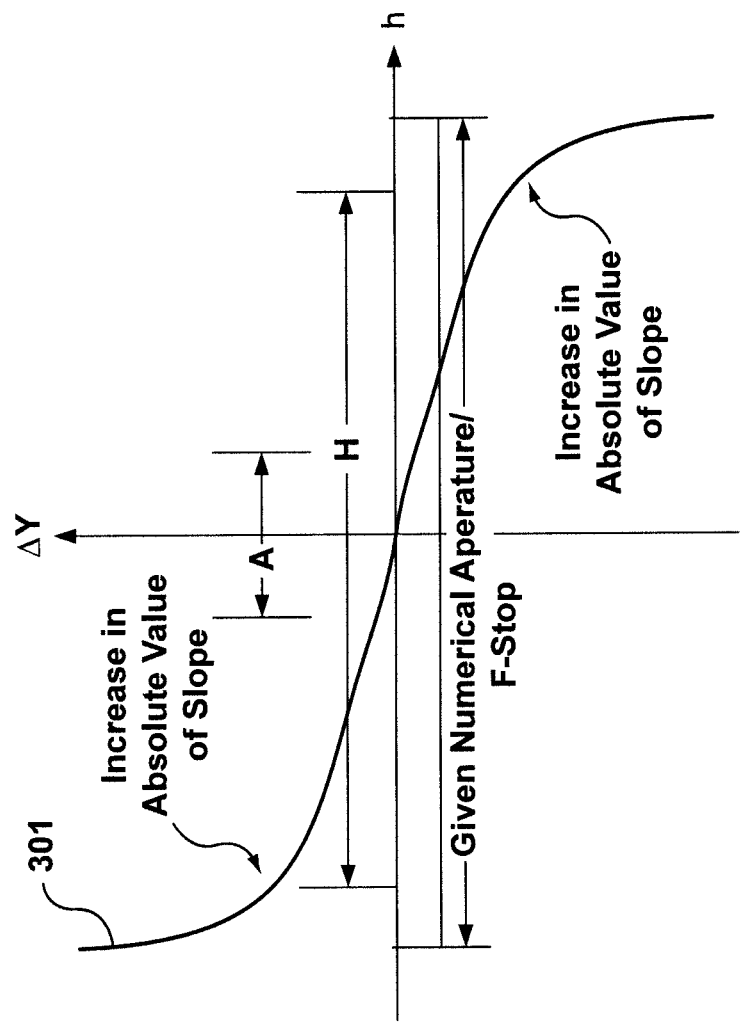
FIG. 3 depicts an illustrative ray fan plot of the spherical lens of FIG. 2, according to non-limiting implementations.

This can be represented in a ray fan plot, as depicted in FIG. 3, which shows a curve 301 of transverse displacement $\Delta Y$ plotted as a function of radial pupil coordinate h for lens 125. Curve 301 is merely meant to represent trends in spherical aberrations, and is not meant to be an exact representation of a ray fan plot of lens 125.

It is apparent that curve 301 is not linear, however close to a radial pupil coordinate of "0", curve 301 can appear linear. In other words, below an aplanatic point, represented as a diameter A, curve 301 appears linear, however this apparent linearity is a reflection of the behavior of Equation (1) for small values of the radial pupil coordinate h, and does not reflect an actual linear function. However, above the aplanatic point, curve 301 does not appear linear and hence spherical aberrations are occurring at lens 125. To be clear, spherical aberrations occur at all values of radial pupil coordinate h, but for small values of h (e.g. below the aplanatic point), the spherical aberrations are small and/or negligible. Further, it is apparent that at a diameter H of lens 125, a change in direction occurs in curve 301: specifically, an inflection occurs that does not include local maxima, local minima and points where a derivative of the ray fan plot is zero. The change in direction, rather, indicates that an absolute value of a slope of curve 301, in the vicinity of diameter H, is increasing. Put another way, there is an increase in the absolute value of the slope of the ray fan plot, as represented by curve 301, at one or more of about the aplanatic point, and at radial pupil coordinates that are larger (and/or beyond) the aplanatic point (as depicted).

This change in slope can be related back to Equation (1) as follows: the combination of the given numerical aperture and the one or more lenses are configured to balance a third order spherical aberration, a fifth order spherical aberration and a seventh order spherical aberration, to suppress one or more of: local maxima and local minima; and, the points where a derivative of the ray fan plot is zero. Hence, a numerical aperture and/or F-stop are chosen for aperture stop 127 that is greater than diameter H. For air, in some implementations, an F-stop of F/4 can correspond to such a numerical aperture, as indicated on FIG. 3. However, other numerical apertures, and/or other F-stops are within the scope of present implementations. For example, F-stops ranging from about F/2 to about F/8 are within the scope of present implementations.

In other words, in relay lens system, a numerical aperture of aperture stop 127 is chosen such that the diameter of aperture stop 127 is greater than the aplanatic point and/or an aplanatic diameter.

Further, the combination of the conditions of: introducing a spherical aberration; and suppressing one or more of the following in a ray fan plot of the spherical aberration: local maxima and local minima; and, points where a derivative of the ray fan plot is zero, ensures a non-linear curve with an increase in the absolute value of the slope of the ray fan plot, as ray fan plots of spherical aberrations are inherently non-linear. Further, by suppressing local maxima, local minima, and points where a derivative of the ray fan plot is zero, ensures the increase in the absolute value of the slope of the ray fan plot.

Figure 4A:
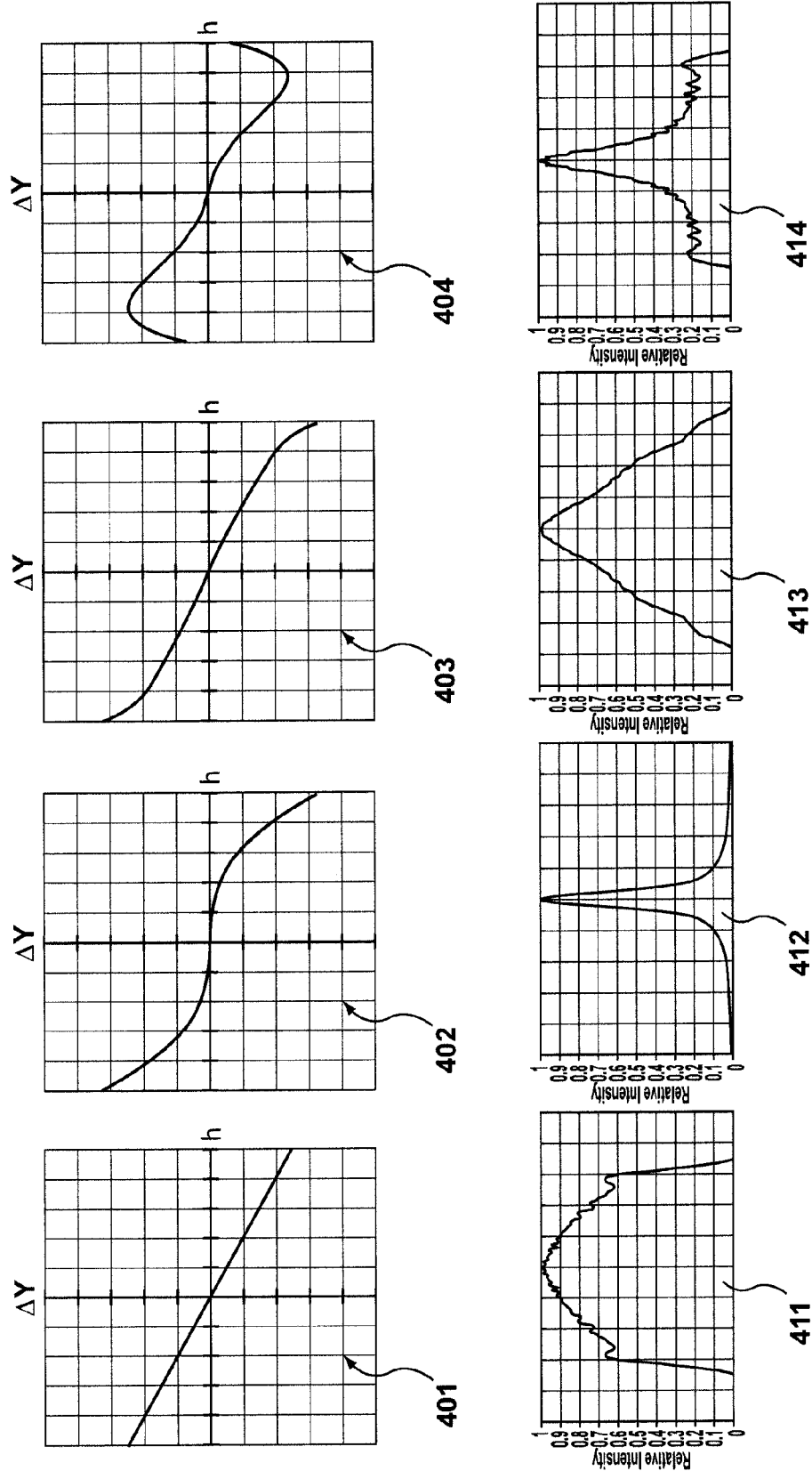
FIG. 4A depicts different ray fan plots and associated pixel spread functions for different simulations of the relay lens system of FIG. 1, according to non-limiting implementations.

To further illustrate the effect of spherical aberrations greater than a first order spherical aberration on light transmitted through relay lens system 101, attention is next directed to FIG. 4A which depicts four ray fan plots represented by 401, 402, 403, 404 of different models of one or more lenses 125, each ray fan plot representing a different design of relay lens system 101, each design having a different spherical aberration. Each ray fan plot in FIG. 4A is modeled at light output 123 and/or represents a total spherical aberration introduced into light transmitted through relay lens system 101. It is assumed in FIG. 4A that light 107 is generally uniform. FIG. 4A further depicts curves 411, 412, 413, 414 showing an effect of each respective ray fan plot of curves 401, 402, 403, 404 on a pixel spread function (PxSF) of relay lens system 101; each curve 411, 412, 413, 413 is provided as relative intensity (y-axis) plotted as a function of relative position (x-axis), for example a pixel position in an image produced by at least one first light modulator 103-1. A PxSF is indicative of how relay lens system 101 shapes and/or changes square (and/or rectangular) pixels in images of light 109; in other words the PxSF is indicative how relay lens system 101 changes light 109 received light input 121 to light 111 exiting light output 123. PxSF can be determined by assuming that a pixel entering relay lens system 101 is square, with sharp edges, and modelling and/or measuring the effect of a given design of relay lens system 101 on the pixel as it exits relay lens system 101. Hence, each of curves 401, 402, 403, 404 represent a ray fan plot of the entirety of relay lens system 101 (i.e. the cumulative effect of all lenses 125, and aperture stop 127 on light passing there through), and each of curves 411, 412, 413, 414 represent a PxSF of the entirety of relay lens system 101 (i.e. the cumulative effect of all lenses 125, and aperture stop 127 on light passing there through).

Curve 401 is linear, and represents an ideal situation, with no spherical aberrations occurring in relay lens system 101: hence, curve 401 is indicative of relay lens system 101 simply defocusing a pixel and/or blurring a pixel. The effect of such defocusing on the PxSF of relay lens system 101 can be seen in curve 411 where many ripples occur in the PxSF. Such ripples are undesirable it is difficult to model their effect on a final image produced by least one second light modulator 103-2 and/or they produce undesirable distortions in final image produced by at least one second light modulator 103-2.

Curve 402 includes a third order spherical aberration in relay lens system 101, and hence assumes that a combination of the given numerical aperture and the one or more lenses 125 are configured to introduce a third order spherical aberration in light and/or pixels between light input 121 and light output 123. The effect of introducing a third order spherical aberration on the PxSF of relay lens system 101 can be seen in curve 412 where no ripples occur in the PxSF, but the PxSF comprises a large peak with a small half-width.

However, for the desired high dynamic range in system 100, it has been determined that the spherical aberration of relay lens system 101 should change a shape of a pixel in the light transmitted there through from an approximate square shape at light input 121 to one or more of: an approximate Gaussian shape at light output 123; a pseudo-Gaussian shape at light output 123; and, a shape with a broad central region and a tail that extends over a plurality of pixels in the light 111 at light output 123.

For example, in some implementations, one pixel in light 109 (e.g. one pixel of an image formed using at least one first light modulator 103-1) can be spread over a size of about four to about twenty pixels on at least one second light modulator 103-2 (though such dimensions are not to be considered particularly limiting). Such pixel spreading will be described in more detail below with reference to FIG. 4B. Hence, as curve 412 is dominated by very narrow peak, it may not be ideal for some implementations of system 100. However, for other implementations, for example high brightness implementations, using a PxSF represented by curve 412 can result in the desired high dynamic range.

Hence, attention is next directed to curve 403, which includes combination of a third order spherical aberration, a fifth order spherical aberration, and a seventh order spherical aberration in relay lens system 101, and hence assumes that a combination of the given numerical aperture and the one or more lenses 125 are configured to introduce a combination of a third order spherical aberration, a fifth order spherical aberration, and a seventh order spherical aberration in light and/or pixels between light input 121 and light output 123, with each of the third, fifth and seventh orders balanced to produce curve 403. Such balancing can occur by choosing and/or adjusting one or more of: at least one of type, radius of curvature, thickness, and material of each of lenses 125; positions of one or more lenses 125; a position of aperture stop 127; and a size of a diameter of aperture stop 127. Such choosing and/or adjusting can occur either in an optical model of one or more of system 100 and relay lens system 101 and/or once system 100 and/or relay lens system 101 is assembled and/or deployed. Further, it is not necessary to calculate exact value of $a_3$, $a_5$, and $a_7$ in Equation (1); rather, at least one of type, radius of curvature, thickness, and material of each of lenses 125, the positions of one or more lenses 125, a position of aperture stop 127, and a size of a diameter of aperture stop 127 can be chosen and/or adjusted until the desired ray fan plot, and/or the desired pixel spreading, is achieved.

Further, the third order spherical aberrations, fifth order spherical aberrations and seventh order spherical aberrations are "balanced" to suppress local maxima, local minima and/or points where a derivative of the ray fan plot is zero, as in curve 403. In contrast, see curve 404, described below, for an example of the effect of "unbalanced" third order spherical aberrations, fifth order spherical aberrations and seventh order spherical aberrations.

The effect of introducing, and balancing, a third, fifth and seventh order spherical aberrations on the PxSF of relay lens system 101 can be seen in curve 413 where no ripples occur in the PxSF, and the PxSF comprises a large peak with a broad full width half maximum. In other words, curve 413 comprises a shape with a broad central region and a smoothly degraded tail that extends over a plurality of pixels in light at light output 123 and/or over a plurality of pixels of at least one second light modulator 103-2.

Attention is next directed to curve 404 which includes local maxima, local minima and/or points where a derivative of the ray fan plot is zero. Such local maxima, local minima, and the like, have a detrimental effect on the PxSF of relay lens system 101. Specifically, curve 404 results when third, fifth and seventh order spherical aberrations are not "balanced" to suppress local maxima, local minima and/or points where a derivative of the ray fan plot is zero. Such local maxima, local minima and/or points where a derivative of the ray fan plot is zero can also occur when yet further higher orders spherical aberrations occur in relay system 101, for example spherical aberration orders greater than seventh order spherical aberrations.

The effect of such unbalancing, and/or introducing spherical aberration orders greater than seventh order spherical aberrations on the PxSF of relay lens system 101 can be seen in curve 414 where ripples occur in the PxSF, and the PxSF comprises a large peak with a narrow half-width, on top of a complicated and rippled base. Such ripples are undesirable it is difficult to model their effect on a final image produced by least one second light modulator 103-2 and/or they produce undesirable distortions in final image produced by at least one second light modulator 103-2. Further, the larger ripples, the more difficult they can be to model and/or the greater the distortions they introduce into the final image.

Hence, in some implementations, the combination of the given numerical aperture of aperture stop 127, and the one or more lenses 125 are configured to balance third, fifth and seventh order spherical aberrations and/or suppress spherical aberration orders above a seventh order spherical aberration in the spherical aberration, for example to suppress ninth order spherical aberrations and above. In these implementations, an aperture of aperture stop 127 comprises a diameter that, at a given position of aperture stop 127 relative to a given lens 125 that introduces at least a portion of the spherical aberration, one or more of contributes to balancing third, fifth and seventh order spherical aberrations, and filters out aberrations in light that are larger than one or more of a third order spherical aberration, a fifth order spherical aberration and a seventh order spherical aberration. Put another way, a diameter of an aperture of aperture stop 127 is chosen so that local maxima, local minima and/or points where a derivative of the ray fan plot is zero in a ray fan plot of relay lens system 101 are suppressed and/or eliminated.

While such suppression may not entirely eliminate ripples in the PxSF, the suppression will minimize the effect on both the ray fan plot and light transmitted through relay lens system 101.

Hence, in general, relay lens system 101 is configured to introduce a well-controlled spherical aberration to light transmitted there through. Specifically, relay lens system 101 is configured to both: suppress local maxima, local minim and, points where a derivative of the ray fan plot is zero in an associated ray fan plot; and, as a result suppress ripples in the PxSF.

In some implementations, relay system 101 is configured to provide a smoothly degraded tail in the PxSF and/or control the PxSF such that it is one or more of Gaussian, pseudo-Gaussian and a shape with a broad central region and a tail that extends over a plurality of pixels in the light at light output 123. In some implementations, the smoothly degraded tail can be achieved by including a combination of fifth and seventh order spherical aberration, and the third order spherical aberration is included in order to make the central part of the PxSF broad and flat. To achieve this, the ray fan plot includes regions outside a central region (e.g. the central region including an aplanatic region) with an increase in absolute value of the slope, but excluding local maxima, local minima, and points where a derivative of the ray fan plot is zero, in order to avoid ripples in the PxSF.

However, in implementations where much higher F/# optics are used, using third order spherical aberrations, and suppressing fifth order spherical aberrations, can also lead to the desired high dynamic range. However, this can have other effects on system 100, such diffraction effects, efficiency effects, and etendue effects. In short, at least one of type, radius of curvature, thickness, and material of each of lenses 125, positions of lenses 125 and aperture stop 127 can be adjusted based on a given aperture of aperture stop, to balance the various effects of the aperture, and achieve the high dynamic range.

In some implementations, the PxSF, and/or the spherical aberration, that leads to the desired high dynamic range can be defined with respect to an upper boundary function and a lower boundary function. For example, attention is next directed to FIG. 4B, which depicts a curve 421 comprising a lower boundary on a PxSF of relay lens system 101, a curve 423 comprising an upper boundary on a PxSF of relay lens system 101, and a curve 425 comprising an average thereof. Curves 421, 423, 425 are plotted as relative intensity (y-axis) as a function of a distance (x-axis) from a given pixel of an image produced by at least one first light modulator 103-1. Further, each of curves 421-423, 425 are one or more of: an approximate Gaussian shape; a pseudo-Gaussian shape; and, a shape with a broad central region and a tail that extends over a plurality of pixels.

Each of the upper boundary and the lower boundary can be defined based on one more of modeling, simulations, experience, experimentally, boundary conditions of system 100, and the like. For example, as depicted, light from a pixel being shaped by PxSF is to be, at a minimum, spread over +/−5 pixels (i.e. the lower boundary represented by curve 421) and at a maximum spread over about +/−10 pixels (i.e. the upper boundary represented by curve 423). However, in other implementations, other curves representing an upper boundary and a lower boundary can be defined, for example in implementations where high F/# optics are used.

In specific non-limiting implementations, the spherical aberration introduced by relay lens system 101 changes a shape of a pixel in the light from an approximate square shape at light input 121 to a function having an upper boundary and a lower boundary defined as follows:

$$LB(r) = 0.9 \times (\tfrac{1}{2} + \tfrac{1}{2} \cos(\pi r/N)) \text{ for } r < N \qquad \text{Equation (2)}$$

$$LB(r) = 0 \text{ for } r \geq N \qquad \text{Equation (3)}$$

$$UB(r) = 1.1 \exp(-(r/N)2) \qquad \text{Equation (4)}$$

where UB is the upper boundary, LB is the lower boundary, r is a distance from a centre of the pixel, and N is a pixel dimension of a dither pattern in the light entering light input 121. For example, in implementations where a 5×5 pixel dither pattern is used, N=5. However, in other implementations, other size dither patterns can be used, and hence other value for N. Further, with reference to FIG. 4B, the lower boundary curve 421 can be represented by Equation (2) and Equation (3), and the upper boundary curve 423 can be represented by Equation (4).

However, in some implementations, the function can be within a given percentage of one or more of the upper boundary and the lower boundary, as defined (for example) by one or more of curves 421, 423, and Equations (2), (3), (4). For example, the given percentage can be about 10%. In other words, the PxSF can be within the given percentage of curves 421, 423, either higher or lower, and the high dynamic range of system 101 can be accomplished. In some implementations, the given percentage can be about 10%.

Further, while specific functions can be used to characterize the shape of curves 421, 423 (e.g. about "Gaussian"), curves 421, 423 can be generically characterized as about meeting one or more of the following conditions: a full width half maximum of the shape can extend over at least about +/−four of the plurality of pixels, and the tail can extends over at least +/−ten of the plurality of pixels; and a full width half maximum of the shape can extend over between about +/−three and about +/−ten of the plurality of pixels, and the tail can extends over between about +/−five and about +/−thirty of the plurality of pixels.

Figure 4B:
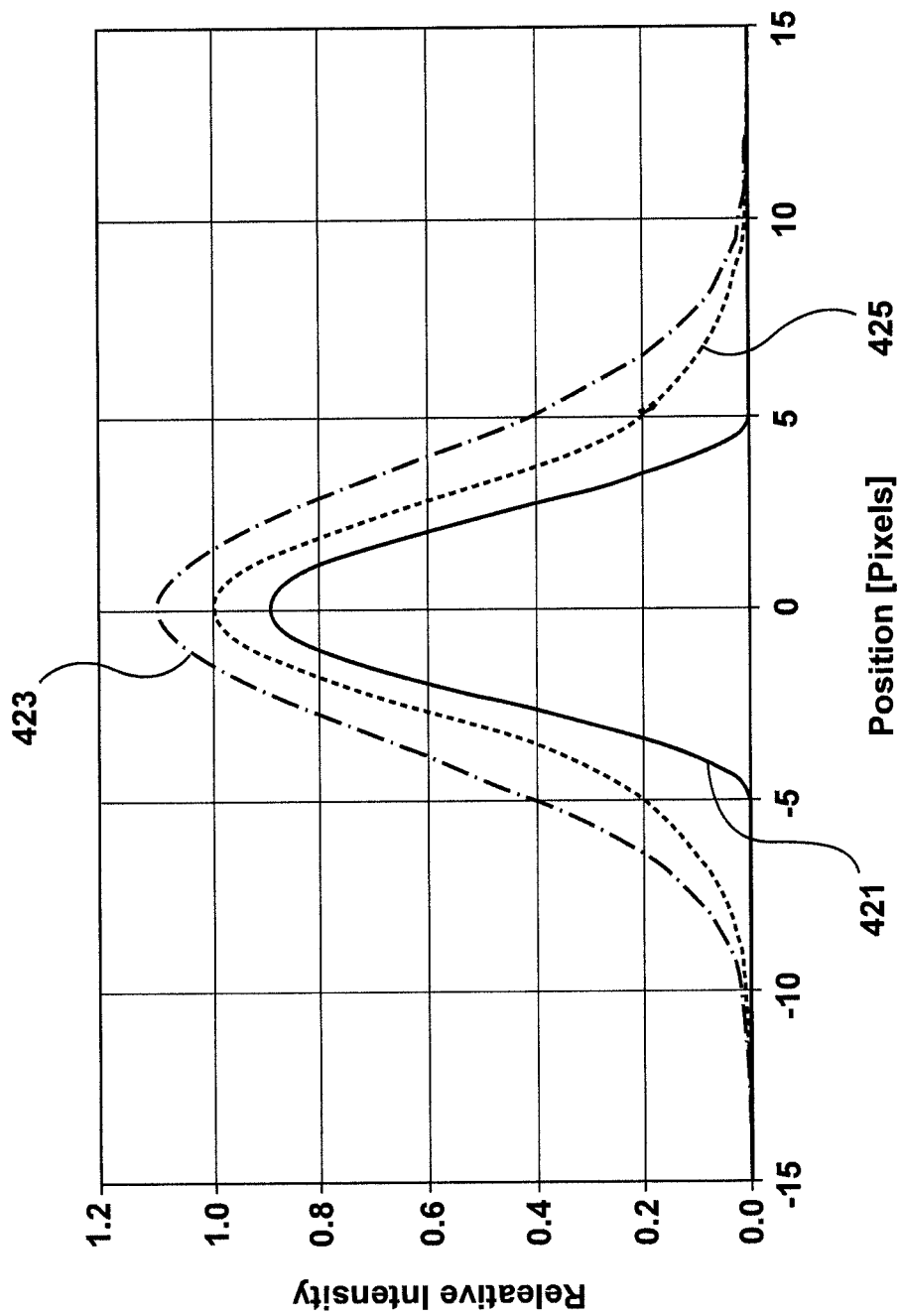
FIG. 4B depicts upper and lower boundaries of a pixel spread function of the relay lens system of FIG. 1, according to non-limiting implementations.
Figure 5:
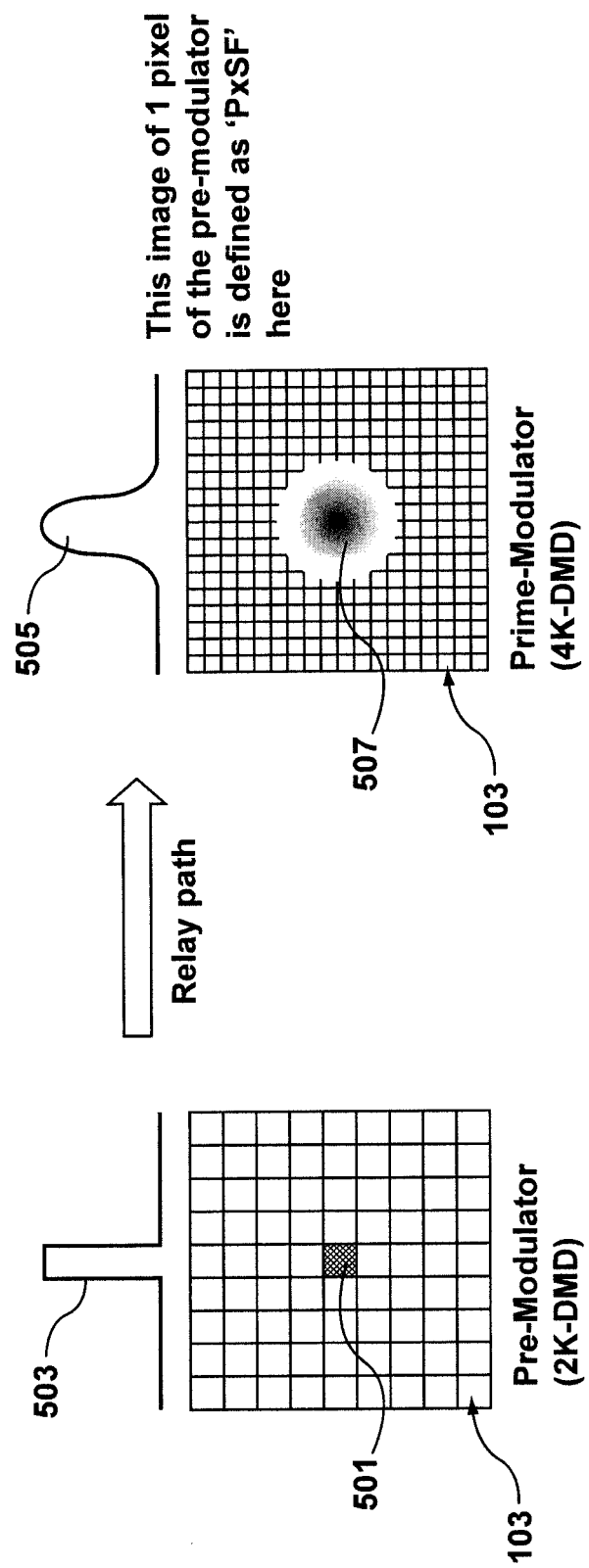
FIG. 5 depicts aspects of a specific non-limiting implementation of the system of FIG. 1, in which a first light modulator comprises a 2K-DMD and a corresponding second light modulator comprises a 4K-DMD and the relay lens system introduces a spherical aberration in light illuminating the second light modulator, according to non-limiting implementations.

Attention is next directed to FIG. 5, which depicts aspects of a specific non-limiting implementation of system 100, and specifically a portion of each of first light modulator 103-1 and second light modulator 103-2. In FIG. 5, a first light modulator 103-1 comprises a 2K-DMD and a corresponding second light modulator 103-2 comprises a 4K-DMD. The concepts discussed with respect to FIGS. 4A, 4B are further illustrated in FIG. 5.

A pixel 501 at first light modulator 103-1 is generally square, so that pixels in light reflected from first light modulator 103-1 has a square and/or rectangular shape as shown in curve 503. However, after the reflected light is transmitted through relay lens system 101 (i.e. the "Relay Path" of FIG. 5), and a given spherical aberration is incorporated into the reflected light (for example, in the ray fan plot of curve 403), pixels in the reflected light change to a curve 505, similar to curve 413. Further, each pixel in the transmitted light is spread over an area of second light modulator that is greater than an area of pixel 501, as indicated by pixel 507, which is a pixel in the transmitted light illuminating second light modulator 103-2 and is not a pixel of second light modulator 103-2. However, pixel 507 is generally centred on a pixel of second light modulator 103-2 that corresponds to pixel 501 on first light modulator 103-1 but is spread over several pixels of second light modulator 103-2, for example in a range of +/−4 pixels to +/−30 pixels.

As such, first light modulator 103-1 can also be referred to as a "pre-modulator" which produces a lower resolution version of an image, and second light modulator 103-2 can be referred to as a "prime-modulator" which produces a higher resolution version of the image that is illuminated with a blurred version of the lower resolution version of the image to be projected.

Further, a specific non-limiting successful prototype uses a 1.2" 2K-DMD as the pre-modulator, having a pixel pitch of about 13.68 nm, and a 1.4" 4K-DMD as the prime modulator, having a pixel pitch of 7.56 nm. The relay lens system of the successful prototype spreads pixels from pre-modulator over about 137 to 274 μm on the prime-modulator (from +/−about 5 pixels to +/−about 10 pixels relative to the pixel pitch of the pre-modulator, and/or from +/−about 9 pixels to +/−about 36 pixels relative to the pixel pitch of the prime-modulator).

It is further appreciated that the described pixel spreading occurs for each pixel in light 109, to produce light 111, which is used to illuminate the at least one second light modulator 103-2. It is yet further appreciated that the described pixel spreading occurs for each colour pixel in light 109.

Attention is next directed back to FIG. 1 where further aspects of system 100 and relay lens system 101 are described.

As described above, at least one lens 125 comprises a spherical lens. The spherical lens can be located before or after aperture stop 127. Indeed at least one of type, radius of curvature, thickness, and material of each of lenses 125, the positions of each lens 125, the number of each lens 125, and the position and size of aperture stop 127 can be determined by one or more of modeling, simulations, experience, experimentally, boundary conditions of system 100, and the like.

Further, in some implementations reflector 129 can be used to align and/or rotate images in light 109 to align with one or more second light modulators 103-2. For example, in specific non-limiting implementations, each light modulator 103 can be rectangular and, due to geometric constraints arranged so that, if relay lens system 101 did not include reflector 129, the rectangular image in light 109 and light 111 would be at 90° to one or more second light modulators 103-2. Such geometric constraints can be introduced through the use of a dual prism structure in prisms 105 (which can be symmetrical, approximately symmetrical and/or asymmetrical), as described in co-pending application entitled "Two-stage Light Modulation for High Dynamic Range" to Michael Perkins, Duane Scott Dewald and Nathan Wainwright and filed on 2013, Nov. 4 with application Ser. No. 14/070,627, which describes system 100 in further detail.

In any event, to correct for this 90° misalignment, reflector 129 can introduce a 90° turn in images in light 109 so that images in light 111 align with one or more second light modulators 103-2. In other words, reflector 129 can hence be configured to relay light 109 received from light input 121 towards light output 123. While FIG. 1 depicts only one reflector 129, in other implementations, relay lens system 101 can comprise more than one reflector 129, and specifically an odd number of reflectors 129, to correct for the 90° misalignment. An odd number of reflectors 129 will have the same effect as one reflector 129. Hence, relay system 101 can further comprise an odd number of reflectors 129 configured to relay the light received from light input 121 towards light output 123

Further, while reflector 129 is depicted as being between a specific two of one or more lenses 125, an odd number of reflectors 129 can be located between any two lenses of one or more lenses 125, as long as relay lens system 101 otherwise introduces the above described spherical aberration in light transmitted there though. Indeed, when relay lens system 101 comprises more than one reflector 129, the different reflectors 129 can be located between different pairs of adjacent lenses 125. Alternatively, an odd number of reflectors 129 can be located external to relay lens system 101, and the 90° turn in the images can be introduced prior to light entering relay lens system 101 or after light exits relay lens system 101.

In some implementations, the one or more lenses 125 can be further configured to magnify the light from light input 121 to light output 123, wherein the magnification can be: greater than one, less than one, or about one. Hence, in implementations where one or more light modulators 103-1 are similar to one or more light modulators 103-2, a magnification of one or more lenses 125 can be 1:1. However, in implementations where one or more light modulators 103-1 are different from and/or smaller and/or larger than one or more second light modulators 103-2, a magnification of one or more lenses 125 can be different from 1:1. In other words, in these implementations, one or more lenses 125 can magnify images in light 109 to larger images or smaller images in light 111.

In some implementations where magnification occurs in relay lens system 101, there can be a tradeoff between keystone distortion and the Scheimpflug principle. In such implementations, relay lens system 101 can be bi-telecentric to reduce keystone distortions. Further, positional adjustments to one or more second light modulators 103-2 and/or prisms 105-2 can reduce focussing issues caused by the Scheimpflug principle, for example to better align one or more second light modulators 103-2 with a plane of images in light 111.

It is appreciated that light input 121 can comprise a first lens 125-1 in the one or more lenses 125. Further light output 123 can comprise a last lens 125-6 in the one or more lenses 125. Further, while light relay lens system 101 is depicted as being contained in a box, and the like, there is no such requirement on relay lens system 101. For example, each of lenses 125, aperture stop 127, and reflector 129 can be mounted within system using suitable respective holders and/or mounting apparatuses.

In some implementations, relay lens system 101 is bi-telecentric. Further, to obtain a desired telecentricity for relay lens system 101, light input 121 can be telecentric and hence, light input 121 can comprise a telecentric lens with an entrance pupil at infinity. Similarly, light output 123 can be telecentric, and hence light output 123 can comprise a telecentric lens with an exit pupil at infinity. In implementations where both light input 121 and light output 123 are telecentric, relay lens system 101 is bi-telecentric.

However, such bi-telecentricity can further depend on components of system 100 external to relay lens system 101. For example, light 109 entering relay lens system 101 can be telecentric, which can be a function of optics of system 100 prior to relay lens system 101.

While it has been assumed heretofore that an aperture of aperture stop 127 is generally circular, in other implementations an aperture of aperture stop 127 can be one or more of oval and asymmetrical, to correct for an anisotropic numerical aperture of the light 109 entering light input 121. Such asymmetry of aperture stop 127 can compensate for an inherent anisotropic numerical aperture of light 109 received from prisms 105-1.

Figure 6:
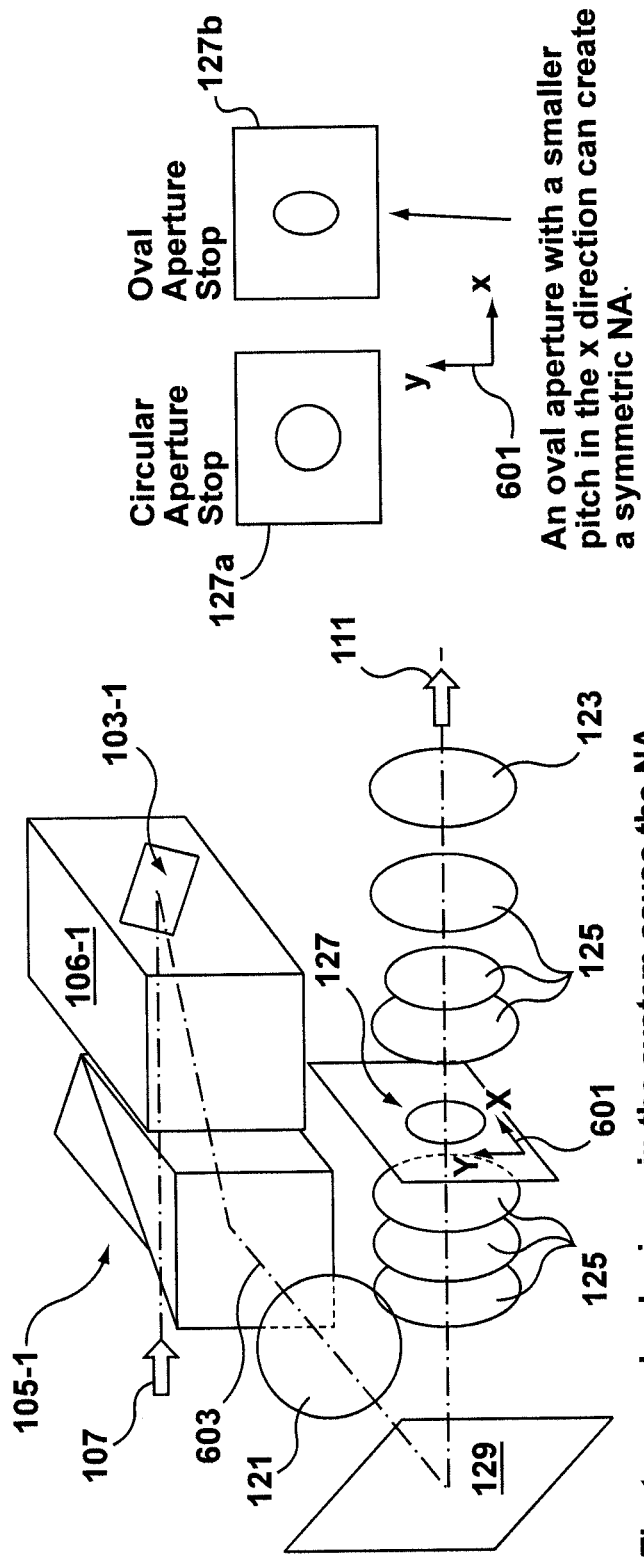
FIG. 6 depicts the system of FIG. 1 with an oval aperture in an aperture stop, according to non-limiting implementations.

For example, attention is next directed to FIG. 6 which depicts components of system 100 in particular non-limiting implementations. FIG. 6 depicts first light modulator 103-1, as well as an associated prism assembly (that includes prisms 105-1 and rectangular prism 106), as described above. FIG. 6 further depicts input light 107 and light 111 exiting relay lens system 101. Light input 121 and light output 123 are depicted as lenses (for example telecentric lenses), and lenses 125 are also depicted, as well as reflector 129. Aperture stop 127 is further depicted as between two of lenses 125. An X-Y coordinate system 601 is depicted at aperture stop 127 for reference. Further, an optical axis 603 of system 100 and/or light relayed through system 100 is depicted. It is apparent that coordinate system is perpendicular to optical axis 603 (e.g. optical axis 603 represents a "Z" direction).

In any event, the depicted prism assembly can cause an anisotropic numerical aperture in light transmitted through relay lens system 101: for example, as depicted, the numerical aperture in the X-direction can be a given percentage larger than the numerical aperture in the Y-direction. To correct for this distortion, an aperture of aperture stop 127 can be about the same given percentage smaller in the X-direction, than in the Y-direction creating an isotropic and/or symmetrical numerical aperture of light 111 exiting relay lens system 101. In some implementations the given percentage can be about 10%.

FIG. 6 also depicts details of two variants on aperture stop 127: a aperture stop 127a with a circular aperture, which can be used for aperture stop 127 when light entering relay lens system 101 has an isotropic and/or symmetric numerical aperture; and an aperture stop 127b with an oval and/or asymmetric aperture, which can be used for aperture stop 127 when light entering relay lens system 101 has an anisotropic numerical aperture. Other shapes of apertures are within the scope of present implementations, however, for example to correct for other types of anisotropy in light entering light input 121.

Further, aperture stop 127 can comprise one or more of: wherein the aperture stop comprises one or more of: an iris; a cat's eye; apparatus (not depicted) configured to manually adjust a size of an aperture of aperture stop 127; and, one or more of a motor and a stepper motor (not depicted) configured to adjust a size of the aperture of the aperture stop 127. In other words, a size of an aperture of aperture stop 127 can be adjustable, either manually or using a motor. Such adjustments to a size of an aperture of aperture stop 127 can be used to tune a PxSF of relay system 101.

With further reference to FIG. 1, in implementations where relay lens system 101 comprises compensator plate 131, compensator plate 131 can be configured to compensate for other types of aberrations in images in light 111, for example astigmatism and coma which can lead to unwanted aberrations in projected images. For example, compensator plate 131 can comprise a tilted parallel plate with similar aberrations as wedged prisms 105-1, 105-2; hence compensator plate 131 can be used offset the unwanted aberrations in the prism by adjusting parameters such as the thickness, tilt angle, and/or tilt direction of compensator plate 131.

Indeed, in yet further implementations, at least one of one or more lenses 125 and aperture stop 127 is configured to adjust one or more of: focus, zoom, and shape of a pixel of the light (e.g. PxSF). For example, a position of at least one of one or more lenses 125 can be adjustable along an optical axis of relay lens system 101 such that one or more of focus, zoom, and shape of a pixel of light 111 is adjustable by adjusting a position of at least one of the one or more lenses 125. For example, an optical axis of relay lens system 101 comprises an axis along which light 109, 111 travels through relay lens system 101. Hence, for example, one or more of one or more lenses 125 can be mounted in a holder, which is, in turn, mounted to a track within relay lens system 101, so that one or more of lenses 125 can be moved along the track in a direction of the optical axis of relay lens system 101.

In some implementations a position of at least one of one or more lenses 125 is manually adjustable. In other implementations, relay lens system 101 can further comprises at least one of a motor and a stepper motor (not depicted) for adjusting the position of at least one of one or more lenses 125, for example along the optical axis of relay lens system 101 and/or the above described track. Hence, in these implementations, the motor and/or stepper motor is configured to move a holder, which in turn holds one or more of one or more lenses 125. In some implementations, at least a two of one or more lenses 125 can be adjustable as a group, either manually and/or using a suitable motor.

Hence, while not depicted, relay lens system 101 can further comprise one or more of: first apparatus configured to manually adjust a position of at least one of the one or more lenses 125; second apparatus configured to adjust positions of at least a two of the one or more lenses 125 as a group; and, at least one of a motor and a stepper motor configured to adjust positions of one or more of the one or more lenses 125.

For example, lens 125-1 can be shifted along an optical axis to adjust a focus of light 109, 111 on both aperture stop 127 and one or more light modulators 103-2, and hence also a focus of projected light 113.

Further, at least a two of one or more lenses 125 can be adjustable as a group. For example, at least a first subset of one or more lenses 125 can be adjustable as a group for adjusting focus, at least a second subset of one or more lenses 125 can be adjustable as a group for adjusting zoom, and at least a third subset of the one or more lenses 125 can be adjustable as a group for adjusting a shape of a pixel spread function.

In some implementations, lenses 125-5, 125-6 can be adjustable, as a group, along the optical axis to adjust zoom in relay lens system 101, and/or system 100.

Similarly, lenses 125-3, 125-4 can be adjustable, as a group, along the optical axis to adjust a shape of a pixel spread function. For example as aperture stop 127 is located between lens 125-4 and lens 125-5, a position of lenses 125-3, 125-4 can affect the shape of the PxSF of light transmitted through aperture stop 127, for example by changing an angle that light impinges on aperture stop 127 and/or by changing a spatial distribution of light impinging on aperture stop 127.

In yet further implementations, as described above, aperture stop 127 can comprise one or more of an iris, a cat's eye, and the like, such that a size of an aperture of aperture stop 127 can be adjustable. Hence, as aperture size can be adjusted, a shape of the PxSF can also be adjusted. For example, as described above, the diameter of an aperture of aperture stop 127, relative to a diameter of a spherical lens affects the PxSF. Hence, the diameter can be adjusted until the desired PxSF is achieved.

As described above, compensator plate 131 can be used to adjust for astigmatism and/or coma. In some implementations, compensator plate 131 can be configured to rotate about a tilt axis to adjust for astigmatism and/or coma. In other implementations, compensator plate 131 can be configured to adjust a thickness thereof, and/or system 100 can be modular so that a compensator plate of a different thickness can replace compensator plate 131.

In yet further implementations, system 100 can be configured to adjust for other aberrations. For example, one or more light modulators 103-2, along with the associated prism assembly, can be rotated, as a group, about a diagonal, longitudinal, and/or transverse axis to adjust for image plane tilt. Similarly, one or more light modulators 103 can be shifted along an optical axis of system 100 to adjust for axial color aberrations.

In some implementations, adjustments to the various components of system 100 can be made once, and their various positions locked down, for example when system 100 is provisioned. In other implementations, the adjustments to the various components of system 100 can be made after system 100 is provisioned and/or after system 100 is deployed, for example as the various components age and their properties change, and/or as their positions shift due to movement of system 100 (e.g. an HDR projector).

In any event, disclosed herein is a relay lens system that introduces a spherical aberration into light transmitted from a first light modulator to a second light modulator in an HDR projector where the first light modulator is controlled to provide an image of a first resolution, and the second light modulator is controlled to provide a similar imager of a higher resolution. The image of the first resolution is used to illuminate the second light modulator to direct the light in a manner that produces a high dynamic range in a projected image. The combination of a given numerical aperture of an aperture stop of the relay lens system and one or more lenses of the relay lens system are configured to: introduce a spherical aberration in the light between the light input and the light output; and, suppress one or more of the following in a ray fan plot of the spherical aberration: local maxima and local minima; and, points where a derivative of the ray fan plot is zero. This results in changing pixels in the transmitted lower resolution image from generally square (and/or rectangular) to generally a shape with a broad central region and a tail that extends over a plurality of pixels in the light at the light output, which has been determined to provide good predictability in simulating the system, and further enables better control over light illuminating the second light modulator as compared to when the pixels are simply blurred (e.g. they include ripples, and the like, which leads to other aberrations in the projected image). This can be achieved by using an aperture stop with aperture having a diameter greater than an aplanatic point of one or more lenses of the system; the aperture stop can be further configured to suppress orders of spherical aberrations that lead to local maxima, local minima, and/or points where a derivative of ray fan plot of the relay lens system is zero, and/or lead to ripples in the pixel spread function of the system.

Further, in some implementations, positions of various components of the system and/or the relay lens system, can be adjustable to compensate for unwanted aberrations (i.e. aberrations that produce visual distractions in a projected image), for example moving various components with respect to an optical axis of the system and/or an optical axis of the relay lens system. Such adjustments can be used to change one or more of zoom, focus, a pixel spread function, astigmatism, coma, image plane tilt, axial and/or lateral color aberrations, and the like. The adjustments can include, but are not limited to, shifting lenses of the relay lens system along the optical axis, changing a tilt and/or thickness of a compensator plate, rotating the light modulators along with its associated prism assembly, shifting the light modulators along the optical axis, and changing a size of an aperture of an aperture stop. The adjustments can be performed manually and/or with the assistance of motors and/or stepper motors. Further, such adjustments can be made when the system is provisioned, and/or can be adjusted after the system is provisioned.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A relay lens system comprising:
    a light input;
    a light output;
    one or more lenses configured to relay light from the light input to the light output; and,
    an aperture stop configured to provide a given numerical aperture to the light being relayed through the one or more lenses, the combination of the given numerical aperture and the one or more lenses are configured to introduce a spherical aberration in the light between the light input and the light output, the spherical aberration changing a shape of a pixel in the light from an approximate square shape at the light input to a function having an upper boundary and a lower boundary defined as follows:

$LB(r) = 0.9 \times (\frac{1}{2} + \frac{1}{2} \cos(\pi r/N))$ for $r < N$ $LB(r) = 0$ for $r \geq N$ $UB(r) = 1.1 \exp(-(r/N)^2)$ where UB is the upper boundary, LB is the lower boundary, r is a distance from a centre of the pixel, and N is a pixel dimension of a dither pattern in the light entering the light input.

2. The relay lens system of claim 1, wherein the combination of the given numerical aperture and the one or more lenses are further configured to suppress one or more of the following in a ray fan plot of the spherical aberration: local maxima and local minima; and, points where a derivative of the ray fan plot is zero.

3. The relay lens system of claim 2, wherein the combination of the given numerical aperture and the one or more lenses are further configured to balance a third order spherical aberration, a fifth order spherical aberration and a seventh order spherical aberration, to suppress one or more of: the local maxima and the local minima; and, the points where a derivative of the ray fan plot is zero.

4. The relay lens system of claim 3, wherein a full width half maximum of the shape extends over at least about +/−four of the plurality of pixels, and the tail extends over at least +/−ten of the plurality of pixels.

5. The relay lens system of claim 4, wherein a full width half maximum of the shape extends over between about +/−three and about +/−ten of the plurality of pixels, and the tail extends over between about +/−five and about +/−thirty of the plurality of pixels.

6. The relay lens system of claim 4, wherein the spherical aberration changes a shape of a pixel in the light from an approximate square shape at the light input to one or more of:
    an approximate Gaussian shape at the light output;
    a pseudo-Gaussian shape at the light output; and,
    a shape with a broad central region and a tail that extends over a plurality of pixels in the light at the light output, as compared to the light input.

7. The relay lens system of claim 1, wherein the function is within a given percentage of one or more of the upper boundary and the lower boundary.

8. The relay lens system of claim 1, wherein the spherical aberration comprises one or more of a third order spherical aberration, a fifth order spherical aberration, and a seventh order aberration in a ray fan plot of the spherical aberration.

9. The relay lens system of claim 1, wherein the combination of the given numerical aperture and the one or more lenses are configured to one or more of:
    balance a third order spherical aberration, a fifth order spherical aberration and a seventh order spherical aberration, to suppress one or more of: a local maxima and a local minima on a ray fan plot of the spherical aberration; and, points where a derivative of the ray fan plot is zero; and,
    suppress spherical aberrations in the light that are larger than one or more of: a third order spherical aberration; a fifth order spherical aberration; and a seventh order spherical aberration.

10. The relay lens system of claim 1, wherein an aperture of the aperture stop comprises a diameter that, at a given position of the aperture stop relative to a given lens, introduces at least a portion of the spherical aberration, and one or more of:
  balance a third order spherical aberration, a fifth order spherical aberration and a seventh order spherical aberration, to suppress one or more of: a local maxima and a local minima on a ray fan plot of the spherical aberration; and, points where a derivative of the ray fan plot is zero; and,
  suppress spherical aberrations in the light that are larger than one or more of: a third order spherical aberration; a fifth order spherical aberration; and a seventh order spherical aberration.

11. The relay lens system of claim 1, wherein at least one of the one or more lenses comprises a spherical lens.

12. The relay lens system of claim 1, wherein the given numerical aperture comprises an F-stop in a range of about F/2 to about F/8.

13. The relay lens system of claim 1, wherein an aperture of the aperture stop is:
  circular; or,
  one or more of: an oval; and asymmetrical, to correct for an anisotropic numerical aperture of the light entering the light input.

14. The relay lens system of claim 1, wherein the aperture stop comprises one or more of:
  an iris;
  a cat's eye;
  an apparatus configured to manually adjust a size of an aperture of the aperture stop; and,
  one or more of a motor and a stepper motor configured to adjust a size of the aperture of the aperture stop.

15. The relay lens system of claim 1, further comprising an odd number of reflectors configured to relay the light received from the light input towards the light output.

16. The relay lens system of claim 1, wherein the relay lens system is bi-telecentric.

17. The relay lens system of claim 1, wherein the one or more lenses is further configured to magnify the light from the light input to the light output, wherein the magnification can be: greater than one, less than one, or about one.

18. The relay lens system of claim 1, wherein a position of at least one of the one or more lenses is adjustable along an optical axis of the relay lens system such that one or more of focus, zoom, and shape of a pixel of the light is adjustable by adjusting a position of at least one of the one or more lenses.

19. The relay lens system of claim 1, further comprising one or more of:
  a first apparatus configured to manually adjust a position of at least one of the one or more lenses;
  a second apparatus configured to adjust positions of at least a two of the one or more lenses as a group; and,
  at least one of a motor and a stepper motor configured to adjust positions of one or more of the one or more lenses.

20. The relay lens system of claim 1, further comprising a compensator plate configured to compensate for one or more of astigmatism and coma of the light.

* * * * *